(12) United States Patent
Noble

(10) Patent No.: X3799
(45) Date of Patent: Jan. 12, 1824

(54) THRASHING MACHINE

(76) Inventor: Andrew Noble

Andrew Noble.
Letters Patent

The Schedule referred to in these Letters Patent and making part of the same, containing a description in the words of the said Andrew Noble himself of his improvement in the Thrashing Machine.

---

The machine frame, without the machinery is about 10 feet long, 3 feet and about [illegible] inches wide, and [illegible] feet 4 inches high — supported by four corner posts of hard wood, about 7 inches square, into which are morticed two side and one end pieces of pine plank two inches thick and about fifteen to eighteen inches deep from the top of the posts; and into these side pieces is framed or morticed a similar end piece, about [illegible] inches from the opposite end, which leaves a space for the rotation of the horizontal cylinder by which the grain is thrashed. On one side is framed into the two end pieces a similar side piece 6 inches within and parallel to that outer side piece, between which two contiguous side pieces play the pulley wheel or whirl on the axle of the cylinder, and another wheel on a different axle near the centre of the frame lengthwise.

The cylinder is about 3 feet 9 inches long (being the whole width between the inner and further side pieces) lying horizontally and is [illegible] 3 inches diameter, made of hard wood, but hollow; into the outer surface of which are driven, at proper distances, four rows (lengthwise of the cylinder at each quarter of its circumference) of iron teeth, quarter of an inch square at the point, and third of of an inch at the surface of the cylinder projecting-
two inches outwards. Under the cylinder one third part
of its circumference is a concave fall, made of hard wood
commencing about two inches below the axis of the
cylinder into which concave fall conforming to the cir-
cle of the cylinder are driven at proper distances four
rows of similar iron teeth, the rows to be length-
wise of the fall, and to project upwards two inches
These iron teeth in the cylinder, while in rotary mo-
tion, play between the four rows of stationary teeth
in the concave fall leaving the space of about
three sixteenths of an inch on every side them.
[illegible] straw containing the grain is [illegible] on an
[illegible]
[illegible] is about one inch and an half from the
[illegible] the cylinder, and is [illegible] by hand [illegible]
the cylinder [illegible] rotation and between the
the concave fall [illegible] teeth the grain is com-
-pletely and cleanly separated from the stalks. Un-
der and in front of the cylinder and fall is placed
the riddle to separate the grain from the straw,
and at the farther end of the axle of the cylinder
is fixed the machinery which set in motion the rid-
dle and turn the fanners that winnows the grain.
The winnowing apparatus may be attached to, and
detached from the Thrashing Machine at pleasure
Over the upper half of the cylinder is a screen
[illegible] of boards to protect the teeth in, and pre-
vent the straw from passing over, the cylinder when
in operation.
The cylinder has a wood shaft, into each end
of which is driven an iron axle which extends
through the three side pieces of the frame and
play play on composition boxes fixed therein. On the cylinder axle between the two contiguous side pieces of the machine frame, is a pulley wheel or whirl, eight inches in diameter and about 6 inches wide, filling the width between said contiguous side pieces.

At the other end of the frame from the cylinder there is a wood shaft across the three side pieces, lying horizontally at the end of which on the outer side of the frame (and on the same side of the pulley wheel or whirl upon the axle of the cylinder) there is fixed the principal perpendicular wheel, six feet in diameter, which is turned by hand having a handle in the arm of the wheel, and a crank at the opposite end of the shaft, or to be turned by horse power to which it is adapted.

Between the shaft of the large wheel and the axle of the cylinder pulley wheel three fifths of the distance from the former is a second, iron axle running upon composition boxes: which axle passes through the outer and inner side of the frame, on the outer end of which is attached a pulley wheel or whirl 13 inches diameter, over which passes a band [illegible] around the large wheel, and on the same axle between the contiguous sides of the frame is a second wheel, two feet diameter, and about 6 inches wide, over which a broad leather band passes around the pulley wheel on the cylinder axle. The three shafts or axles lie horizontally across the top of the frame and all the wheels and whirls stand perpendicular. Hence, by turning the large wheel by hand, horse or or water power, the whole machinery is put in opera-
tion and the cylinder by which the grain is thrash-
ed, performs nine revolutions to one of the great
wheel. The cylinder revolutions can be multiplied
in a greater ratio, if required.

The thrashing machine, to be turned by hand
including the winnowing apparatus. can be fur-
nished to purchasers from [illegible] to [illegible] dollars and
to be put in operation by one horse power, and
[illegible] dolls additional price. One person can turn
it by hand to thrash and winnow thirty
bushels of grain in a day. and two hands to
turn, and two to attend it can thrash and win-
now sixty bushels in a day. The machinery for
operating by a single horse power. consist of an up-
right shaft with a horizontal wheel on the head
connected with the large perpendicular wheel
of the machine by bands and pulleys or by [illegible]
wheels and pinions.

Done at Alfred in the county of York and
State of Maine, this [illegible]th day of December
[illegible]823.

Andrew Poole.

Lloyd Larkin
Nath[illegible] Littlefield } Witnesses.

Rec[illegible]
[illegible]
Dec. 3[illegible]
1832.

[illegible]

DRAFTSMAN'S DIVISION.

*All communications should be addressed to* "The Commissioner of Patents. Washington, D. C."

2—328 *a.*

*DEPARTMENT OF THE INTERIOR,*

United States Patent Office,

*Washington, D. C.,* ............................................, *189*...

*SIR:*

*The printed* copies of *Patent No.* A Noble Jan 12 1824 are *exhausted.*

*As soon as printed a copy will be mailed you to complete your order.*

*By direction of the Commissioner:*

*Very respectfully,*

*Chief Clerk.*

814316-97-5m